United States Patent [19]

Ealet

[11] 4,401,405

[45] Aug. 30, 1983

[54] HANDLING DEVICE FOR FACILITATING THE CHANGING OF VEHICLE WHEELS, NOTABLY OF AGRICULTURAL TRACTORS AND TRUCKS

[75] Inventor: Pierre M. Ealet, Paris, France

[73] Assignee: Societe Anonyme d'Attelages Lemoine, Reims, France

[21] Appl. No.: 218,439

[22] Filed: Dec. 19, 1980

[30] Foreign Application Priority Data

Dec. 21, 1979 [FR] France .............................. 79 31417

[51] Int. Cl.³ .............................................. B60B 29/00
[52] U.S. Cl. ................................................... 414/428
[58] Field of Search .............................. 414/426–429, 414/703, 641, 433

[56] References Cited

U.S. PATENT DOCUMENTS

| | | | |
|---|---|---|---|
| 2,379,587 | 7/1945 | Moore | 414/427 |
| 2,570,587 | 10/1951 | Noone et al. | 414/428 |
| 2,852,151 | 9/1958 | Smith | 414/428 |
| 3,258,144 | 6/1966 | Reschke | 414/433 |
| 3,830,388 | 8/1974 | Mott | 414/427 X |
| 4,050,597 | 9/1977 | Hawkins | 414/427 |
| 4,095,714 | 6/1978 | Schuster | 414/641 |

*Primary Examiner*—Robert G. Sheridan
*Attorney, Agent, or Firm*—Darby & Darby

[57] ABSTRACT

A device is provided for dismounting and remounting wheels. The device includes two frames articulated to each other at their upper portions in pendulum fashion and are connected by a jack. The first frame is connected to a three point hitch of a tractor or other handling vehicle. The second frame is provided with wheel gripping structure. By swinging the frame having the wheel gripping structure relative to the other frame by operating the jack and manipulating the hitch of the tractor an operator can position the wheel relative to its mount.

15 Claims, 3 Drawing Figures

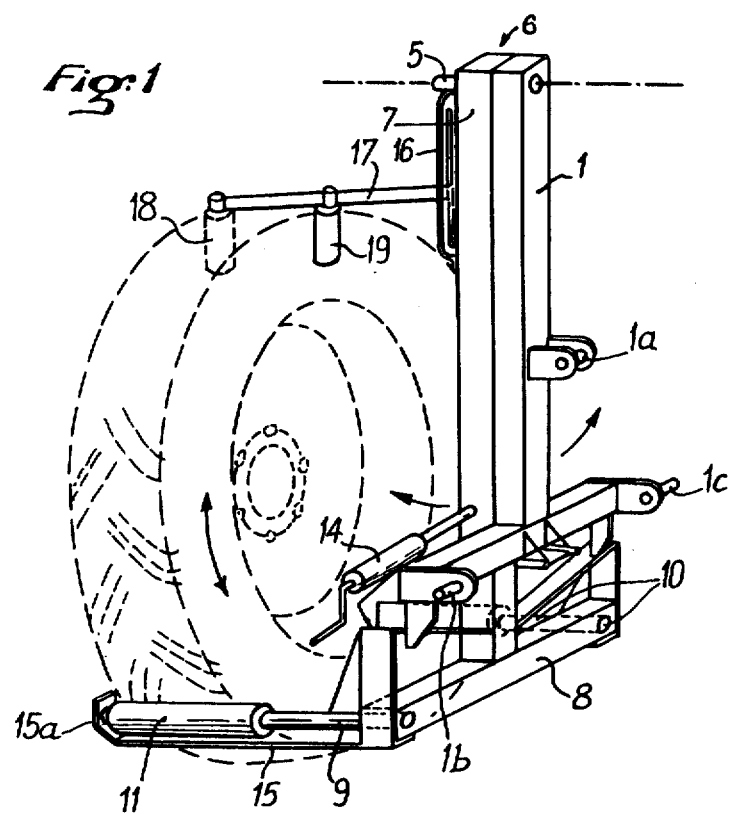
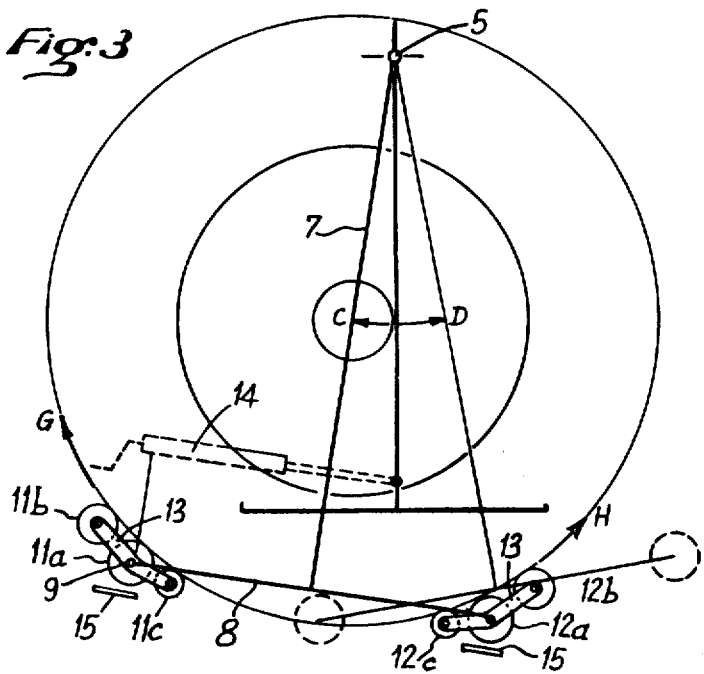

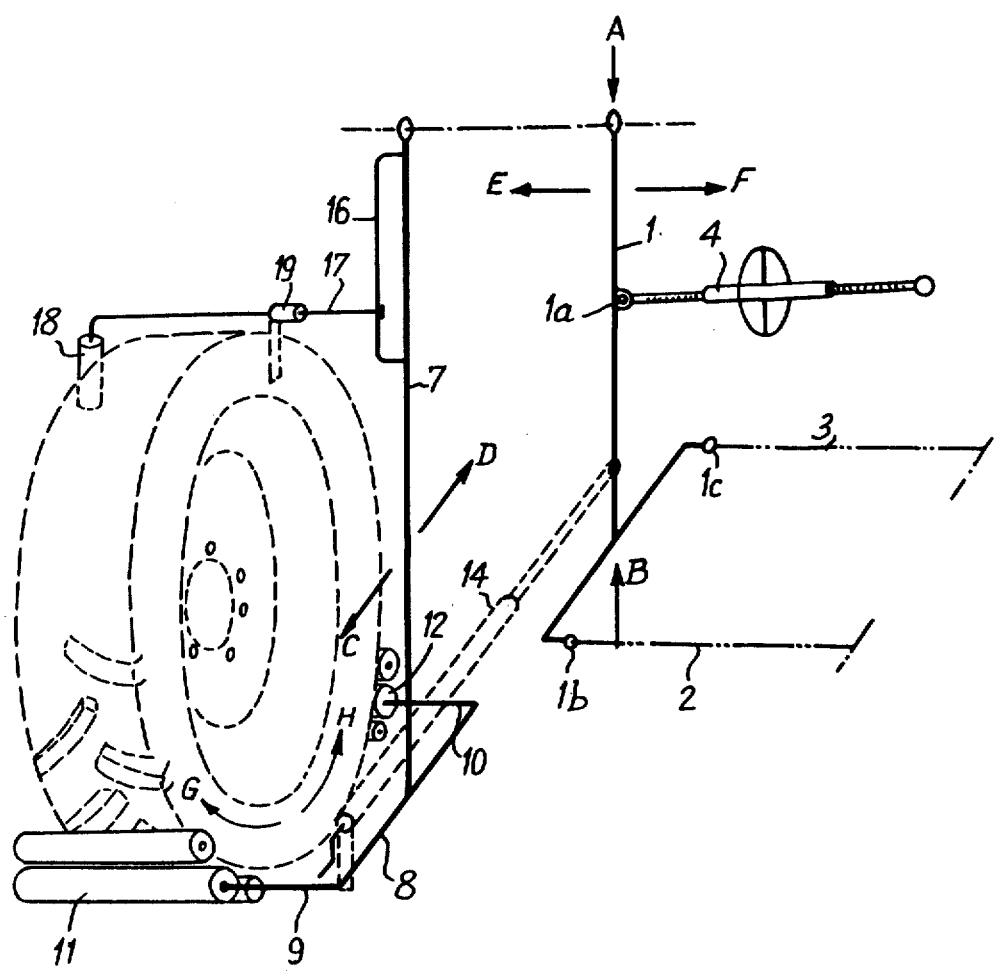

HANDLING DEVICE FOR FACILITATING THE CHANGING OF VEHICLE WHEELS, NOTABLY OF AGRICULTURAL TRACTORS AND TRUCKS

FIELD OF THE INVENTION

The present invention relates to a device used for facilitating the changing of vehicle wheels, notably of agricultural tractors or trucks.

The recent evolution of mechanized agricultural works have had for consequence that the farmer is led to change the wheel train of his tractor several times over the year, according to the works he has to carry out with the same tractor, so as to use either water weighted wheels, (having a weight of the order of 500 kgs), or wide flanged wheels for the treatments, or again twinned wheels, or cage-wheels, etc.

The tractors being ever more powerful, the wheels are heavier and heavier and since labour is increasingly scarcer, the changing of the wheels has to be done by a man alone, which is very difficult, arduous and even dangerous.

OBJECT AND SUMMARY OF THE INVENTION

The object of the present invention is a device allowing a man on his own to change, with the help of a tractor, the wheel or wheels of another tractor.

The device according to the present invention is characterized in that it is made of two frames articulated to each other at their lower portion by a horizontal axis; the first frame being connected to the three point hitch of a tractor; the second frame being provided with gripping means for the wheel of another vehicle.

Preferably, the two frames are connected to each other by means allowing swinging the second frame relative to the first.

BRIEF DESCRIPTION OF THE DRAWINGS

The invention will become more apparent from the following non limiting description, given by way of example, reference being made to the accompanying drawings wherein, FIG. 1 is a perspective view of an embodiment of the invention, FIG. 2 is an exploded schematic view showing the operation of the device, FIG. 3 is a schematic view illustrating the pendular movement of the second frame relative to the first.

DETAILED DESCRIPTION OF THE EMBODIMENTS

Reference being made to said FIGURES, one sees that the device according to the invention comprises a first frame 1, in the shape of a reversed T, which is coupled by trunnions 1a, 1b, 1c to two lower connecting-rods 2 and 3 and to the upper connecting-rod 4 of the hydraulic hitch of a tractor which is not shown.

At its upper end, the frame 1 carries a horizontal axis 5 which, when the frame 1 is coupled, extends in the longitudinal axis of the tractor.

From said axis 5 depends, in a pendular fashion, the frame 6 which, in the example shown, has substantially the same shape as frame 1, meaning that it comprises a vertical beam 7 at the base of which is placed a horizontal beam 8. Preferably, the length of beam 7 is slightly superior to that of the corresponding beam of frame 1; and such that beam 8 is lower than the trunnions 1b and 1c.

The beam 8 is provided at each of its ends with arms 9 and 10, turned rearwardly, so as to form a fork, each of said arms carrying a roller train 11 and 12. Said roller trains are advantageously made of three cylindrical rollers (FIGS. 2 and 3) connected to each other via connecting-rods 13, the central roller 11a or 12a bein coaxial with arm 9 or 10.

The device can also be provided with a single roller 11 or 12 only, as is shown in FIG. 1.

The frames 1 and 6 are coupled to each other via a jack, which can be a mechanical screw jack 14, as is shown, but which can also be hydraulic or pneumatic.

The rollers 11 and 12 (or the roller trains 11 and 12) are protected at their lower portion by protection metal sheathings 15 ending into a turned up portion in the shape of a flange 15a.

At its upper portion, slightly below axis 5, the beam 7 comprises, on its rear face, a slide 16 on which slides a rod 17, substantially horizontal, carrying at its end a fixed vertical cylindrical roller 18 and a mobile similar roller 19.

The operation of the device thus described is the following:

In a first period, the double frame 1-6 being coupled to the hitch device of a tractor, the latter is driven so as to be presented moving back, perpendicularly to the wheel of another vehicle such as a tractor for example, which has to be changed. The device is lowered until the flanges 15a are practically in contact with the ground and the tractor is moved backwards so that the rollers or roller trains 11, 12 pass on either side of the tyre of the wheel to be changed. The tractor hitch is then operated, the effect of which is to lift the frame 1 which drives along the frame 6, the arms 9 and 10 of which lift the tractor wheel, and therefore partly the tractor itself. A wedge is then placed under the tractor, the device is slightly lowered and the fixation bolts of the wheel are then unscrewed. When this is done, the rear roller 18 is passed behind the top of the wheel, the roller 19 is brought against the other flank of the wheel, the device is slightly raised and the tractor is moved forward so as to carry the wheel away.

In order to put the wheel back, the tractor is presented while moving backwards so as to present the wheel facing as best as possible the fixation stud bolts. If the holes of the wheel felly are not exactly opposite said stud bolts, one can on the one hand turn the wheel on its rollers 9 and 12, and on the other hand swing the frame 6 sideways, relative to frame 1, by means of the jack 14. One can also incline the wheel sideways by means of the connecting-rod 4 of the tractor hitch, which inclines the assembly of frames 5 and 6.

Preferably, in order that the fork formed by the two parallel rollers 11 and 12 may grip all the types of wheels of the big tractors presently used, the spacing between the two arms 9 and 10 is of about 1.10 m and the distance between the axes of rollers 11b and 11c is of about 0.20 m.

According to an alternative embodiment, the rod 17 is a threaded rod or is rigidly connected to a jack, so that the inclination of the wheel may be changed without having to operate the connecting-rod 4.

According to another alternative embodiment, the rollers 11 and 12 (or roller trains) can be slidably mounted on the arms 9 and 10 and the rollers 18 and 19 are also slidably mounted along the rod 17. Thus, once the wheel holes have been brought opposite the stud bolts by turning the wheel on the rollers and by pivoting the frame 6, one may move said wheel in translation for threading it onto the stud bolts, without having to drive back the carrying tractor. Indeed, if said tractor is on an uneven ground, it will move sideways and/or in height when driving back and the wheel felly openings may risk not to be opposite the stud bolts.

This device allows therefore a man on his own to dismount and to handle the wheels of heavy weights and sizes. When one has to change the wheel train, one can remove the dismounted wheel and store it in a vertical position against a wall and take another which is also stored in a vertical position.

On the other hand, in the example shown, the frames 1 and 6 are in the shape of a reverse T, but they can also be triangular (their point being upwards) or rectangular, the important thing being that one of them can be coupled to a lifting device and that the other is pendularly articulated to the first along an axis extending along its median axis.

The invention is not limited to the case where the frame is coupled to the hitch device of an agricultural tractor: said frame may be coupled to any handling means allowing at the same time a lifting and a displacement movement, for example an automotive lift truck, a transpalette truck and even a hand-trolley provided with means allowing fixing the frame 1. In such a case, the lifting movement is obtained, as is known, by tipping the trolley.

I claim:

1. A handling device for dismounting and remounting wheels, said device comprising:
    first and second frame members pivotally interconnected along an axis, said second frame member having means for carrying a wheel such that the wheel axis and the pivot axis interconnecting said frames extend in the same direction and are in substantially vertical alignment;
    means for pivoting said second frame member back and forth about the pivot axis interconnecting said frames to move the axis of the wheel into and out of vertical alignment with said pivot axis; and
    means for holding said first frame member to permit said second frame member to pivot relative thereto.

2. A device according to claim 1, wherein the second frame comprises two parallel arms, making a fork, extending rearwardly, parallel to the pivotal axis of the two frames.

3. A device according to claim 2, wherein each of said arms carries a cylindrical roller.

4. A device according to claim 2, wherein each of said arms carries a train of cylindrical rollers.

5. A device according to claim 4, wherein each roller train is made of three rollers, the medium roller being rotatably mounted on the arm.

6. A device according to claim 2, wherein said means for carrying the wheel comprises an upper gripping means cooperating with the parallel arms for maintaining the wheel to be dismounted.

7. A device according to claim 6, wherein the rollers and the upper gripping means are slidably mounted on their supports, so as to allow a translation movement of the wheel carried by the second frame.

8. A device according to claim 6, wherein the gripping means is made of a vertical cylindrical roller placed at the end of a horizontal rod mounted on a support which can slide vertically.

9. A device according to claim 8, wherein said rod carries a second mobile roller which squeezes the wheel when cooperating with the first.

10. The handling device of claim 2, wherein each of said parallel arms of said second frame carries a cylindrical platen sliding longitudinally along the axis thereof.

11. The handling device of claim 2, wherein each of said parallel arms of said second frame carries a series of platens being capable of sliding longitudinally along the axis of said arms and turning around said axis.

12. The handling device of claim 2, wherein said second frame has a gripping means situated at its upper part, said gripping means working in conjunction with said two parallel arms to hold the wheel, said means being composed of a cylindrical platen placed vertically at the end of a horizontal rod, said horizontal rod being slidably mounted on a bracket to move vertically.

13. A device according to claim 1, wherein the frames are in the shape of a reversed T.

14. The handling device according to claim 12, wherein said horizontal rod holds a second platen moving therealong and holding the wheel in conjunction with the first platen.

15. The handling device of claim 1 comprising a jack operative against said second frame to induce pivotal movement between said frame members.

* * * * *